3,288,899
METHOD FOR THE CONTINUOUS MANUFACTURE OF SHAPED ELASTOMERIC MATERIAL

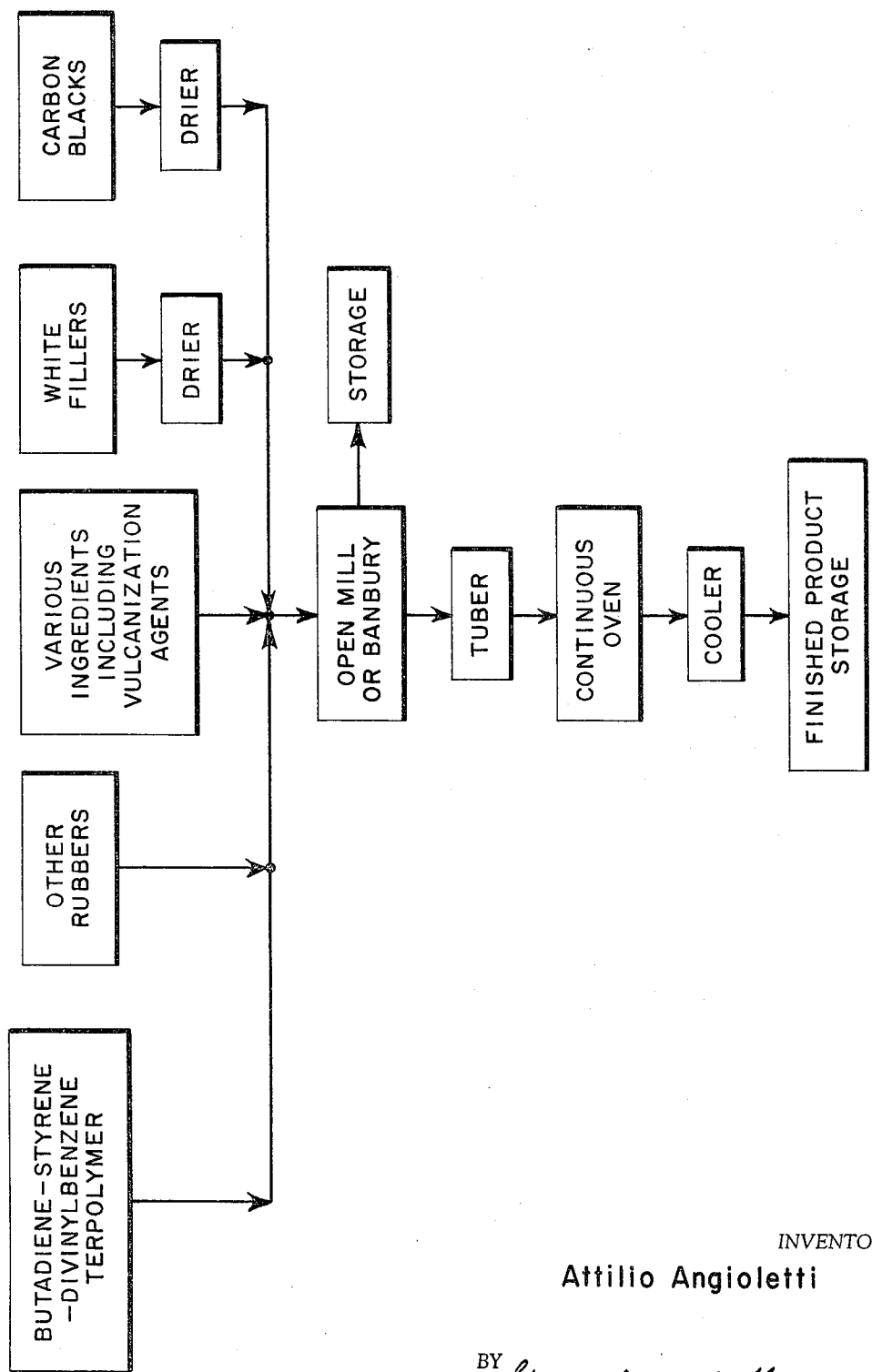

Attilio Angioletti, Milan, Italy, assignor to Pirelli S.p.A., Milan, Italy
Filed May 3, 1963, Ser. No. 277,679
Claims priority, application Italy, June 6, 1962, 11,189/62
9 Claims. (Cl. 264—102)

The present invention relates to the manufacture of any type of continuous lengths of shaped elastomeric material and in particular to a method for the production of said lengths in a continuous manner.

The need of producing shaped elastomeric products, as for instance gaskets, tubes and the like, by means of a continuous process, does not involve substantial technical difficulties with respect to the shaping operation of the uncured material, per se, which is generally carried out by extrusion. There do arise, however, peculiar technical problems in the treatment of such products subsequent to the extrusion operation, among which there may be mentioned the necessity of conferring dimensional stability to the shaped material from its emergence from the extruder until its vulcanization, and the need of avoiding faults, as for instance bubbles, porosity and the like in the material during vulcanization as a result of the formation of gases and vapors and of the release of occluded air, etc.

In the systems heretofore used for the production of shaped elastomeric material by means of a continuous process, the complete solution of the above-cited problems, which are of antithetical character with respect to one another, has not been obtained though some of the difficulties have been overcome in part.

According to one known method the uncured shaped material is caused to pass into a fluid bath at the curing temperature, and after a certain length of travel it emerges from said bath completely vulcanized.

According to another system the uncured shaped material slides on a support consisting of small balls or solid particles, made for instance of glass, which have a very small size and are kept at the curing temperature.

In the systems based on the use of a liquid vulcanizing bath, the wetting medium generally exerts a slight action of containment or pressure on the uncured shaped material which reduces the deformations in the section of the shaped material and the faults of its body and surface during the travel in the vulcanizing phase.

However, the previously known systems for manufacturing shaped material by means of continuous vulcanization have not, until now, found a wide application, both because they are not able to ensure a total elimination of the faults, and because they involve certain operational difficulties. In fact, even nowadays, for the most part, the production of shaped material is carried out according to a discontinuous system, namely by vulcanization in a boiler under pressure of water or steam, or in a mold.

It is the object of the present invention to provide a method for the manufacture of any type of continuous lengths of shaped elastomeric material by vulcanization in air at substantially atmospheric pressure, in a manner which eliminates substantially all of the above-mentioned drawbacks.

Other objects and advantages of the invention will become apparent from the following discussion.

The objects of the present invention are obtained by a process which comprises the steps of preparing an elastomeric composition containing at least 50% based on the total elastomer content of a butadiene-styrene-divinylbenzene terpolymer and one or more fillers, besides the usual ingredients of such elastomeric composition, wherein said fillers are substantially free from moisture and/or gases or other adsorbed fluids, of extruding said composition, and of subjecting the shaped material as it emerges from the extruder to a continuous vulcanization in hot air at a curing temperature and at substantially atmospheric pressure.

The composition used for carrying out the method in accordance with the invention, as said above, must contain a butadiene-styrene-divinylbenzene terpolymer in an amount not lower than 50% based on the total elastomer content. By increasing the percentage of terpolymer the likelihood of the occurrence of faults in the shaped material during vulcanization is reduced, but at the same time the mechanical characteristics of the same are slightly impaired.

The remaining portion of the elastomer content may comprise any suitable elastomer or combination of elastomers. In particular, said elastomers can be chosen from the group consisting of natural rubber, butadiene-styrene copolymer, butadiene-acrylonitrile copolymer, polybutadiene, poly-isoprene and poly-chloroprene.

The elastomers can be both of the normal type or of the so-called "oil-extended" type.

Moreover, the compounds must include suitable fillers, in an amount not less than 30 parts by weight per 100 parts of the total elastomer content.

The fillers may be practically all the fillers commonly used in the rubber industry. In particular, among the light-colored fillers, there can be cited kaolins, silicas, precipitated silicates and metal oxides. Preferably, these fillers are employed in considerably high percentages, i.e. greater than 50% by weight based on the total content of elastomers, and can reach or even exceed 200 parts by weight per 100 parts of the total elastomer content.

The black fillers generally consist of carbon blacks, the ratio of which can be smaller than the ones indicated above with respect to the light-colored fillers, but which in any event should not be less than 30 parts by weight per 100 parts of the total elastomer content.

In order to ensure that the vulcanized shaped elastomeric product be compact, i.e. devoid of bubbles or porosity, it is necessary for the fillers to be substantially free from moisture and/or gases or other adsorbed fluids. Therefore, when it is required, the fillers must be subjected to a suitable preliminary treatment by heat and/or vacuum before their addition to the composition.

As mentioned above, of course, the composition must contain all the ingredients conventionally employed in preparing such shaped elastomeric materials, as for instance softeners and diluents, accelerators, coadjuvants, vulcanizing agents, and antiagers. In particular, since the composition is intended for a continuous curing process, the vulcanizing agents must be of the type having a rapid action, as for instance thiurams, mercapto-benzo-thiazole and its derivatives, carbamates, guanidines, either alone or in combination with one another and in some cases with sulfur.

The composition prepared as described above is extruded by means of an extruding machine in a manner known, per se, it being unnecessary to create vacuum at any point of the machine.

The shaped elastomeric material, as it emerges from the extruder, is immediately passed on to vulcanization. This latter operation is carried out within a tunnel having any shaped section desired and a length suitable with relation to the nature of the composition, the travelling speed of the shaped elastomeric material and the temperature inside the tunnel to allow the complete vulcanization of the shaped material.

During its path along the tunnel, the shaped elastomeric material is carried by a conveyor or belt, preferably made of metal.

The tunnel, the cross-section of which is constant along its whole length, is of suitable size so that its inner walls are at a distance not greater than a few centimeters from the shaped elastomeric material including the inlet and outlet sections of said tunnel.

The tunnel is heated by any suitable means, as for instance by a steam jacket or by electric resistors; which heating means must be distributed in a substantially uniform manner along the whole length of the tunnel. The temperature inside the tunnel must not exceed 200° C. and preferably ranges between 150° and 180° C.

The vulcanization takes place in still air, i.e. without forced circulation.

As the shaped elastomeric product passes from the vulcanization stage, it is collected and cut by conventional means.

The various steps of a method in accordance with the present invention are illustrated in the drawing. As shown, the various components of the elastomeric composition are (1) the butadiene-styrene-divinylbenzene terpolymer, (2) at least one other elastomer, (3) various ingredients such as vulcanization agents and (4) a filler which has been dried. These components are mixed on an open mill or a Banbury mixer; the mixture may then be placed in storage if desired. When required the mixture is passed to a tuber or extruding machine, from which the extruded product is passed to a continuous oven in which vulcanization is carried out in air at atmospheric pressure. Finally the vulcanized product is cooled and passed to storage.

The present invention will be more clearly understood from the following examples which are to be considered as illustrative rather than limiting.

*Example I*

A composition having the following ingredients was used:

| | Parts by weight |
|---|---|
| Butadiene-styrene-divinylbenzene terpolymer | 60 |
| Natural rubber | 20 |
| Butadiene-styrene copolymer | 20 |
| Zinc oxide | 10 |
| Aluminum silicate | 40 |
| Carbon black FEF | 30 |
| Thiuram (tetra-methyl-thiuram-disulphide) | 4 |
| Anti-oxidant (phenyl-beta-naphthylamine) | 1 |
| Paraffin | 6 |
| Protective waxes | 2 |

After extrusion into a strip having a size of 2 cm. by 1 cm., the vulcanization was carried out by passage of the strip on a conveyor belt through a tunnel 50 meters long, at a speed of 6 m. per minute and at a temperature of 160° C. The walls of the tunnel were 4 cm. from the surface of the strip. The shaped product so obtained had the following average characteristics:

| | |
|---|---|
| Breaking load _____gr./mm.$^2$__ | 1100 |
| Elongation at break _____percent__ | 350 |
| Shore hardness | 70 |

*Example II*

A composition having the following ingredients was used:

| | Parts by weight |
|---|---|
| Butadiene-styrene-divinylbenzene terpolymer | 80 |
| Natural rubber | 20 |
| Zinc oxide | 10 |
| Kaolin | 100 |
| Mercapto-benzo-thiazole | 1 |
| Diphenilguanidine | 0.5 |
| Sulfur | 2 |
| Anti-oxidant (phenyl-beta-naphthylamine) | 1 |

Before its addition to the composition, the kaolin was subjected to a thermal treatment in an oven for 6 hours at 160° C. A strip as prepared in Example I was vulcanized by passage in the same tunnel 50 meters long, at a speed of 5 m. per minute and at a temperature of 170° C. The shaped product so obtained had the following average characteristics:

| | |
|---|---|
| Breaking load _____gr./mm.$^2$__ | 700 |
| Elongation at break _____percent__ | 250 |
| Shore hardness | 75 |

The method forming the subject of the present invention is suitable for the manufacture of shaped elastomeric products of any kind, both solid and hollow, as for instance packings and tubes. In particular, it is desirable for the manufacture of shaped products having a complex section, as for instance strips for glasses, refrigerators and the like, since it enables one to maintain in the vulcanized product the sectional configuration that it had as it emerged from the extruder. Furthermore, the method is expeditious and economical, since its speed depends substantially on the speed of extrusion and on the length of the tunnel.

It is obvious that many differing embodiments of this invention may be made without departing from the spirit and scope thereof, and it will be understood therefore that within the scope of the appended claims the invention may be practiced otherwise than as specifically described.

What is claimed is:

1. A method for the continuous manufacture of shaped elastomeric material comprising the steps of (1) mixing a vulcanizable elastomeric composition containing at least 50% based on the total elastomer content of a butadiene-styrene-divinylbenzene terpolymer and, constituting the remaining part of the elastomer content, at least one additional elastomer selected from the group consisting of natural rubber, butadiene-styrene copolymer, polybutadiene, polyisoprene, butadiene-acrylonitrile copolymer and polychloroprene; vulcanization agents; and at least one filler substantially free from moisture, gases, and adsorbed fluids; (2) of extruding said composition, and (3) of subjecting the shaped elastomeric material, after it emerges from the extruder, to continuous vulcanization in hot air at a curing temperature and at substantially atmospheric pressure.

2. A method according to claim 1 in which the fillers are rendered substantially free from moisture, gases, and adsorbed fluids by preliminary heating prior to admixture with the elastomers.

3. A method according to claim 2 wherein said heating is conducted under vacuum.

4. A method according to claim 1 wherein said fillers are rendered substantially free from moisture, gases and adsorbed fluids by treatment under vacuum prior to admixture with the elastomers.

5. A method for the continuous manufacture of shaped elastomeric material which comprises treating a vulcanizable elastomeric composition containing at least 50% based on the total elastomer content of a butadiene-styrene-divinylbenzene terpolymer and, constituting the remaining part of the elastomer content, at least one additional elastomer selected from the group consisting of natural rubber, butadiene-styrene copolymer, polybutadiene, polyisoprene, butadiene - acrylonitrile copolymer and polychloroprene; vulcanization agents; and at least one filler substantially free from moisture, gases, and adsorbed fluids; by the steps of extruding said composition and of subjecting the shaped elastomeric material after it emerges from the extruder to continuous vulcanization in hot air at a curing temperature and at substantially atmospheric pressure.

6. A process according to claim 5 in which the vulcanization is carried out in still air at a temperature of less than 200° C.

7. A method according to claim 5 in which the fillers are selected from the group consisting of kaolin, silicas, precipitated silicates, carbon black and mixtures thereof.

8. A method according to claim 7 in which the fillers are present in an amount not less than 30 parts by weight per 100 parts of the total elastomer content.

9. A method for the continuous manufacture of shaped elastomeric material comprising the steps of preparing a vulcanizable composition containing at least 50% based on the total elastomer content of a butadiene-styrene-divinylbenzene terpolymer; at least one additional elastomer selected from the group consisting of natural rubber, butadiene-styrene copolymer, polybutadiene, polyisoprene, butadiene-acrylonitrile copolymer, and polychloroprene; and at least 30 parts by weight per 100 parts of the total elastomer content of at least one filler which is substantially free from moisture, gases and adsorbed fluids; extruding said composition; and subjecting the shaped elastomeric material after extrusion to continuous vulcanization in hot air at a curing temperature at substantially atmospheric pressure.

References Cited by the Examiner

UNITED STATES PATENTS

| | | | |
|---|---|---|---|
| 1,156,096 | 10/1915 | Price | 264—176 |
| 1,860,411 | 5/1932 | Glidden et al. | 264—347 |
| 2,533,335 | 12/1950 | Wallace | 18—6 |
| 2,677,674 | 5/1954 | Daly | 260—41.5 |
| 2,903,439 | 9/1959 | Wolf | 260—41.5 |
| 2,993,874 | 7/1961 | Hoel | 260—33.6 |
| 3,072,968 | 1/1963 | Watson et al. | 264—176 |
| 3,121,069 | 2/1964 | Dietz | 260—41.5 |
| 3,135,715 | 6/1964 | Hinderer | 260—41.5 |

FOREIGN PATENTS

Morton, M.: Introduction to Rubber Technology, N.Y., Reinhold Publishing Corporation, 1959, p. 232.

Penn, W. S.: Synthetic Rubber Technology, London, Maclaren & Sons, Ltd., 1960, pp. 288, 289.

ROBERT F. WHITE, *Primary Examiner.*

S. A. HELLER, *Assistant Examiner.*